(12) United States Patent
Kaehler et al.

(10) Patent No.: US 8,281,324 B2
(45) Date of Patent: Oct. 2, 2012

(54) SYSTEMS AND METHODS FOR LINKING SOFTWARE APPLICATIONS

(75) Inventors: Adrian Kaehler, North Hollywood, CA (US); Shi-Ping Hsu, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1037 days.

(21) Appl. No.: 12/241,835

(22) Filed: Sep. 30, 2008

(65) Prior Publication Data

US 2009/0235204 A1    Sep. 17, 2009

Related U.S. Application Data

(60) Provisional application No. 61/036,743, filed on Mar. 14, 2008.

(51) Int. Cl.
| | |
|---|---|
| *G06F 13/00* | (2006.01) |
| *G06F 9/45* | (2006.01) |
| *G06F 9/44* | (2006.01) |
| *G06F 17/00* | (2006.01) |
| *G06F 3/048* | (2006.01) |
| *G06F 3/00* | (2006.01) |

(52) U.S. Cl. ........ 719/328; 719/331; 717/136; 717/137; 717/162; 715/249; 715/759; 715/760; 715/761; 715/762; 715/763

(58) Field of Classification Search ........................ None
See application file for complete search history.

(56) References Cited

U.S. PATENT DOCUMENTS

| | | | |
|---|---|---|---|
| 5,546,528 A * | 8/1996 | Johnston | 715/807 |
| 5,760,773 A * | 6/1998 | Berman et al. | 715/808 |
| 6,941,560 B1 | 9/2005 | Lowry et al. | |
| 7,216,181 B1 | 5/2007 | Jannu et al. | |
| 7,426,697 B2 * | 9/2008 | Holecek et al. | 715/788 |
| 7,607,102 B2 * | 10/2009 | Ording et al. | 715/769 |
| 2003/0093479 A1 | 5/2003 | Mellen-Garnett et al. | |
| 2005/0216917 A1 * | 9/2005 | Krishnaswamy et al. | 719/315 |
| 2006/0167897 A1 | 7/2006 | Jones et al. | |
| 2007/0168871 A1 * | 7/2007 | Jenkins | 715/751 |

FOREIGN PATENT DOCUMENTS

| | | |
|---|---|---|
| EP | 1 591 894 A3 | 8/2007 |
| GB | 2 354 847 A | 4/2001 |

OTHER PUBLICATIONS

British Search Report for corresponding GB0904276.3, completed Jun. 23, 2009.
Oki, et al.: "*The Information Bus®—An Architecture for Extensible Distributed Systems*"; In Proceedings of the 14th ACM Symposium on Operating System Principles, Asheville, USA, 1994, p. 58-68.
Kaehler, et al. patent application for "Systems and Methods for Extracting Application Relevant Data From Messages"; filed Sep. 30, 2008.

* cited by examiner

*Primary Examiner* — Lechi Truong
*Assistant Examiner* — Phuong Hoang
(74) *Attorney, Agent, or Firm* — Tarolli, Sundheim, Covell & Tummino LLP

(57) ABSTRACT

A system is provided for linking software applications. The system comprises a message backplane configured to linked software applications by sharing messages associated with events occurring in a respective linked software application with one or more other linked software applications and a controller configured to instruct the message backplane to link software applications.

21 Claims, 10 Drawing Sheets

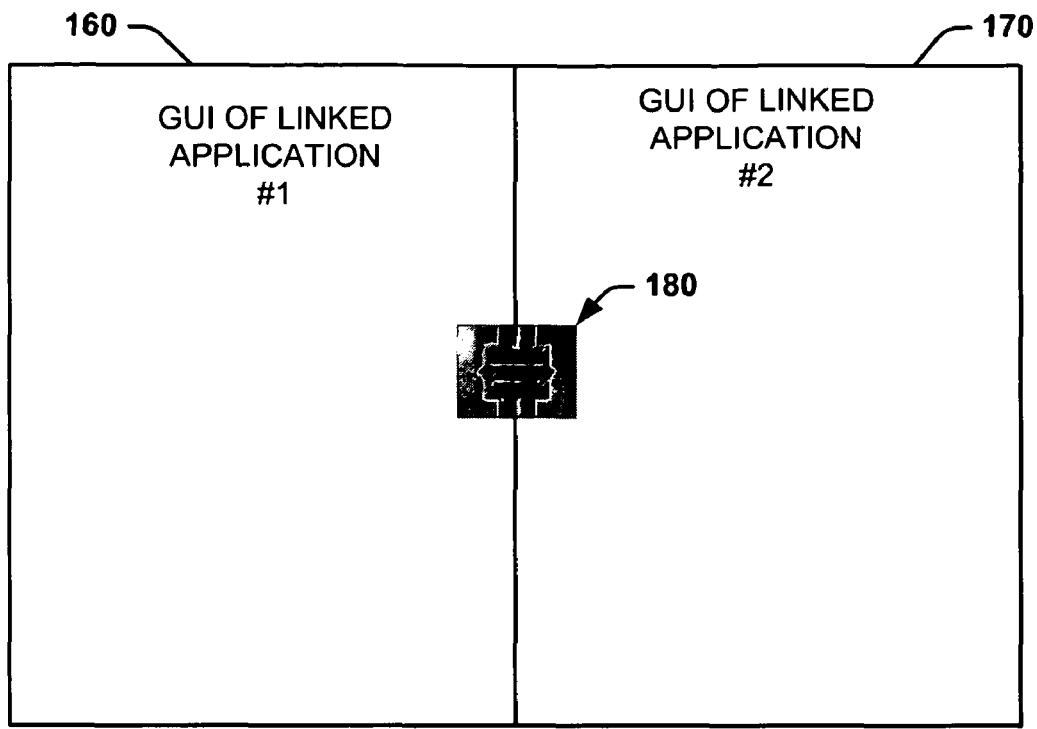
FIG. 9
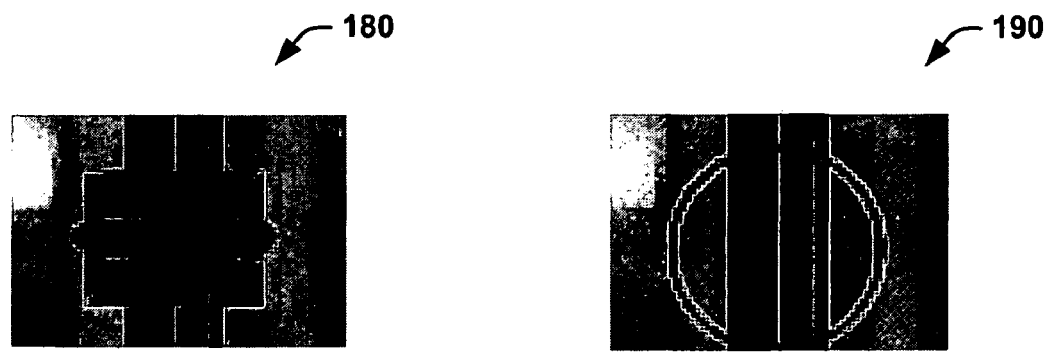
FIG. 10  FIG. 11

SYSTEMS AND METHODS FOR LINKING SOFTWARE APPLICATIONS

RELATED APPLICATIONS

The present invention claims priority from U.S. Provisional Patent Application No. 61/036,743, filed Mar. 14, 2008 and is incorporated herein by reference.

TECHNICAL FIELD

The present invention relates generally to computer software, and more particularly to systems and methods for linking software applications.

BACKGROUND

On a typical modern computer desktop, there are a wide variety of different software applications which are required for a user to complete his or her workflow. These applications may be common desktop applications, or custom applications which are often front-ends to services which reside elsewhere, such as database or analytical tools. Most software application programs are designed to have a front end portion and a back end portion. The front end portion provides a mechanism for a user to interact with functions of the software application, for example, through a graphical user interface (GUI) or an application program interface (API). The back end portion is typically the execution engine for performing the functions and providing responses of the function to the front end portion in response to events that occur in the front end portion. The front end portion and the back end portion communicate with one another through messages that inform the back end portion of events occurring in the front end portion, and instruct the front end portion to respond to messages provide by the back end portion. Software applications generally cannot communicate with one another since the front end portion and back end portion of a given application is designed to communicate with one another and not other front end portions and back end portions.

SUMMARY

In one aspect of the invention, a system is provided for linking software applications. The system comprises a message backplane configured to linked software applications by sharing messages associated with events occurring in a respective linked software application with one or more other linked software applications and a controller configured to instruct the message backplane to link software applications.

In one aspect of the invention, a computer readable medium having computer executable components is provided for linking software applications. The computer readable medium comprising a message backplane component configured to register software application programs for sharing messages and to capture and forward messages that are transmitted between a front end and a back end of a registered software application with other registered software applications, and a controller configured to instruct the message backplane to at least one of register and unregister a given software application.

In another aspect of the invention, a method for linking software applications is provided. The method comprises receiving instructions for linking events between two or more software applications, monitoring messages between a front end and a back end of each linked software application, extracting data types of a given message provided in response to an event of a linked software application, building a message based on the extracted data types and transmitting the built message to a back end of each other linked software applications.

BRIEF DESCRIPTION OF THE DRAWINGS

FIG. 9 illustrates linking of GUIs of application programs in accordance with an aspect of the present invention.

FIG. 10 illustrates a graphically idiom that illustrates the linking of two application windows in accordance with an aspect of the present invention.

FIG. 11 illustrates a graphically idiom that illustrates the unlinking of two application windows in accordance with an aspect of the present invention.

DETAILED DESCRIPTION

Figure 1:
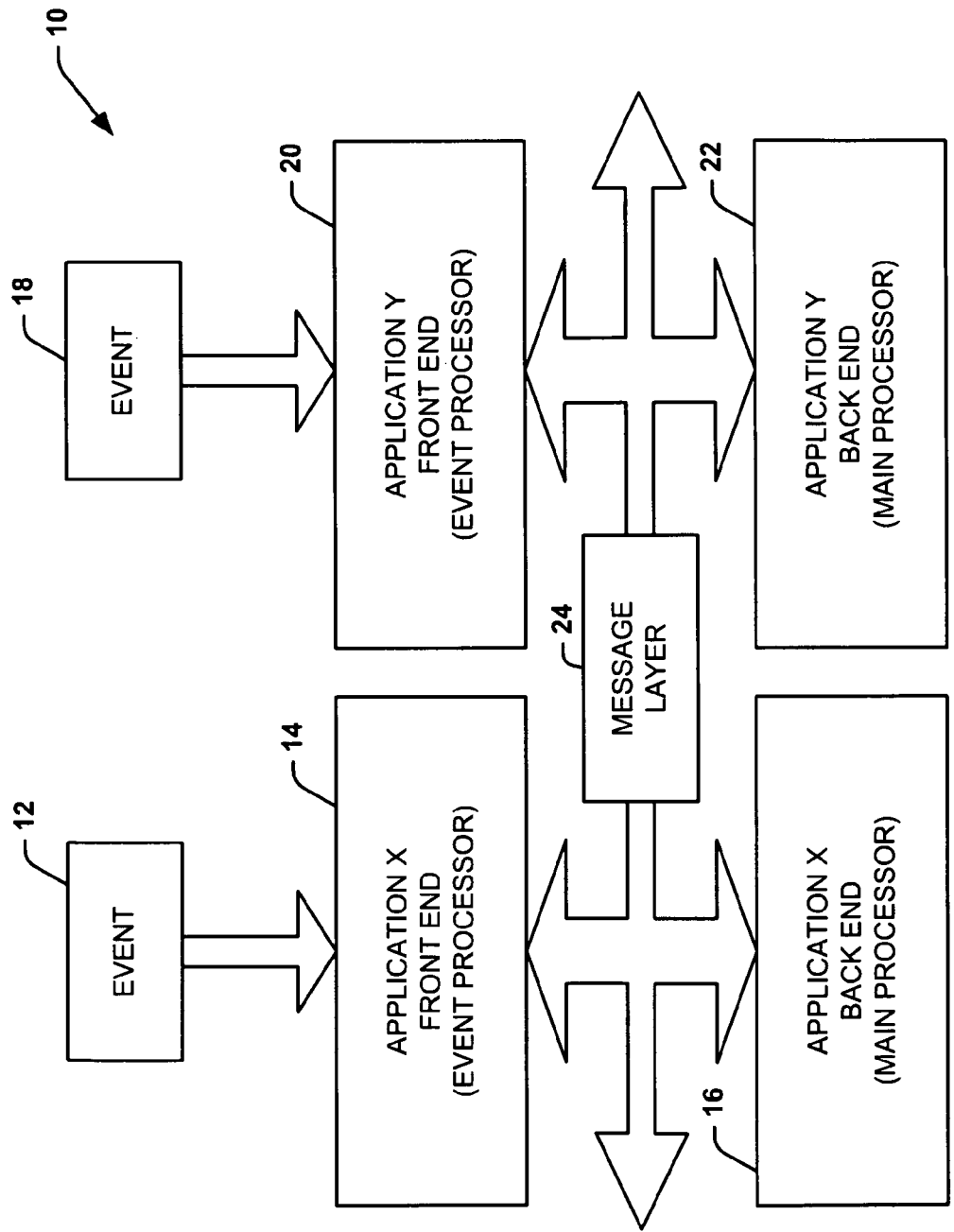
FIG. 1 illustrates a block diagram of a dual layer message bus architecture in accordance with an aspect of the present invention.

FIG. 1 illustrates a block diagram of dual layer message bus architecture 10 in accordance with an aspect of the present invention. The dual layer message bus architecture employs an open collector message layer 24 that serves to communicate events in one process or window with other processes or windows. This is accomplished by separating each application from the event handling functionality. Thus the applications are split into a front end event-processor and a back end main-body. The event processor is responsible for converting interface events (e.g. mouse clicks, keystrokes, etc) into messages which are then passed to the main body. These messages are of an abstract form, represented as key-value pairs, labeled trees, or an analogous data structure (e.g. XML). For example, events 12 on application X are provided to a front end event processor 14 of application X, which generate an associated message over the message layer 24 to both a back end main body 16 of application X and a back end main body 22 of application Y. Furthermore, events 18 on application Y are provided to a front end event processor 22 of application Y, which generate an associated message over the message layer 24 to both the back end main body 22 of application Y and a back end main body 16 of application X.

The back end main body of application Y can respond to a specific information type contained in messages generated in response to events on application X. For example, the messages generated by front end processor of application X may contain a person's name. The back end of application Y may understand information type of a person's name and respond to the information by generating a phone number that can be provided to the front end of application Y for display or for forwarding to another application. In this manner events generated at application X can cause events to occur in application Y and events generated at application Y can cause events to occur in application X.

The unique feature of this arrangement is that the event processor portion of the application not only interprets the interface events, it makes the interpretation of these events available for other applications to subscribe to the messages. In this way, applications can form extended families within which certain messages are understood by all of the applications in the family. In most cases, there is no restriction on the form of the messages, and so the messages may be as rich in content as desired. Applications which do not understand a particular form or type of message which appears on an interface to which they subscribe may simply ignore those messages. Messages can be designed to be easily intercepted (e.g., TCP/IP link), easily understood (e.g., extensible markup language (XML)) and employ a universal language (e.g., a common schema). Any application in this architecture can inherit the message layer, message language and capacity to be connected to other applications.

Figure 2:
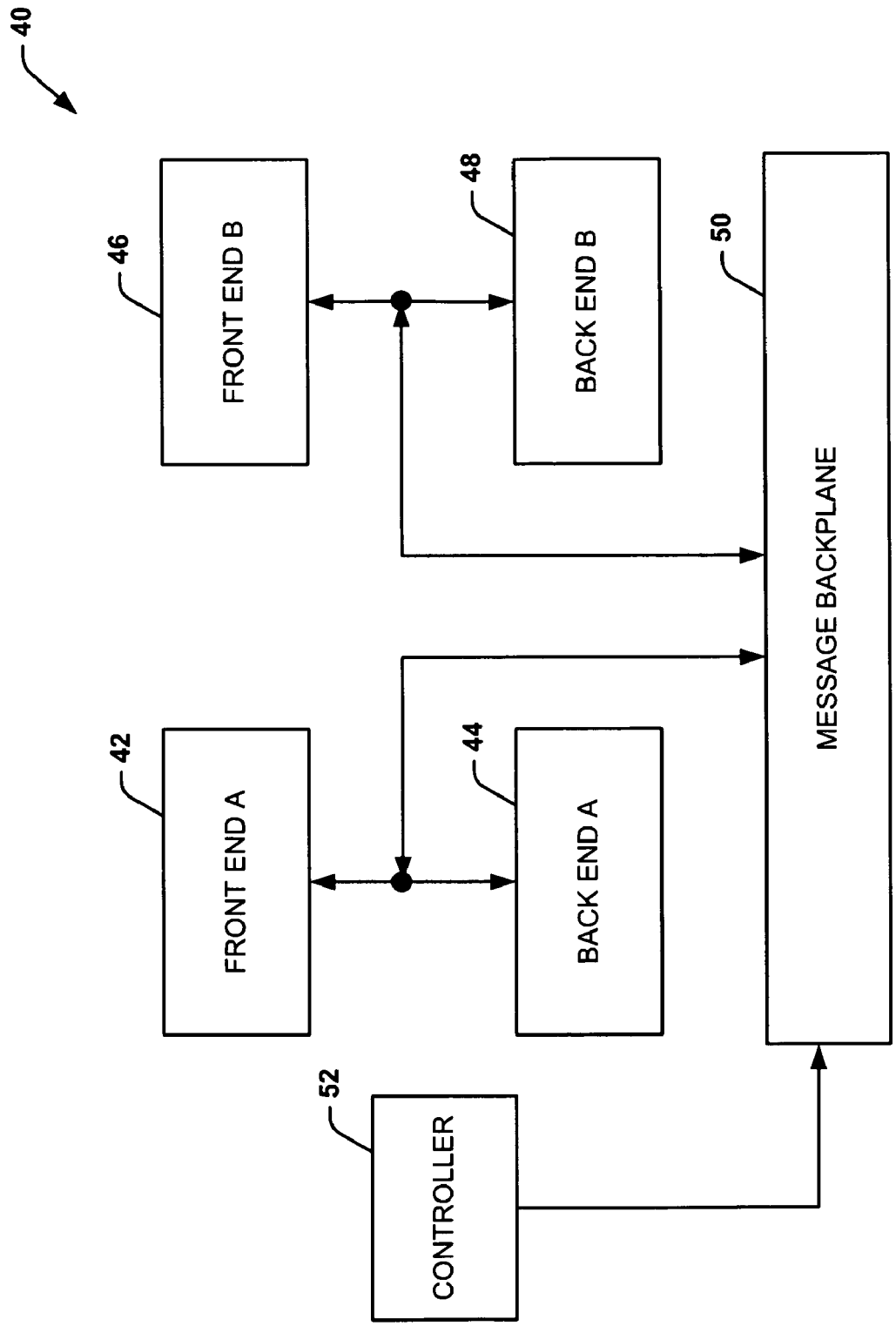
FIG. 2 illustrates a block diagram of a system for linking software applications in accordance with an aspect of the present invention.

FIG. 2 illustrates a block diagram of system 40 for linking software applications in accordance with an aspect of the present invention. The system 40 employs a message backplane 50 that is coupled to a controller application 52. The message backplane 50 is responsible for maintaining the connections between software applications, and any processing which might be required on the individual messages. A new message bus aware application, such as application A and application B, register with the message backplane 50 during startup to indicate that the application is available for connecting with other applications. Application A includes a front end 42 and a back end 44 and Application B includes a front end 46 and a back end 48. The message backplane 50 can for example monitor for TCP/IP connections from the applications which have, or wish to, register with the message backplane 50. In this manner, the message backplane 50 can be located locally or remotely, and similarly the message bus aware applications can be running on a single machine, or be distributed and thus may be connected between multiple machines.

The message backplane 50 can be directed to connect or disconnect applications by instructions arriving over a TCP/IP connection locally or remotely. Therefore, the controller application 52 can communicate with the message backplane 50 to convey user requested connections. Once the applications are linked, the messages between front end 42 and back end 44 of application A are provided to the message backplane 50 which routes these messages to back end 48 of application B. The back end 48 extracts and responds to information of the type that application B understands and generates instructions to front end of application B to cause events to occur based on the received information. Additionally, messages between front end 46 and back end 48 of application B are provided to the message backplane 50 which routes these messages to back end 44 of application A. The back end 44 extracts and responds to information of the type that application A understands and generates instructions to front end of application A to cause events to occur based on the received information. It is appreciated that the present example only illustrates two application exchanging messages, however, many more than two applications can be linked to exchange messages.

A message protocol can be employed to facilitate the registering of applications with the message backplane 50 and the passing and extracting of data types from messages to and from the message backplane 50 to respective applications. In one aspect of the invention, a message protocol can be employed that extracts data types from messages based on systems and methods described in commonly owned application "entitled "Systems and Methods for Extracting Application Relevant Data from Messages", filed the same day as the present application, the entire contents of which is incorporated herein. The following is exemplary pseudocode for a messaging ontology for registering applications with the message backplane and for receiving messages over the message backplane:

Run Method
Connect to backplane on specified host/port
Send hello message with client identifier
Set Icon property based on application window icon
Start thread to receive messages on backplane connected socket
Wait for a message to come over the socket
Match message against registered templates:
    For each child node in incoming message
        If node matches selected template,
            Tag with matched template name
            Send node to host application through OnMessage
Send Method
Send the specified XML/SOP message over the previously connected socket
OnMessage Event
User-registered callback for incoming messages
RegisterSopTemplate
Defines a template to matched against in the XML-based SOP Template Language
SelectSopTemplate
The identifier of a template the application is interested in, either user-defined or from the Standard Template File The following is exemplary pseudocode for executing functions of the message backplane:

Listen on network socket for <hello> command
Create new object for this adapter with given identifier
When next message comes in on this connection:
    If message is a SOP message:
        Send message to every client in this group
        Relay message to each bridge from this group
    If message if a control message:
        Handle control message
Handle control message:
    <Goodbye> - close connection
    <clientinfo> - return client info (host/port/identifier/all properties)
    <listclients> - return list of all current client identifiers
    <propset> - set name/value pair on client object with specified identifier
    <propget> - get name/value pair on client object with specified identifier
    <groupinfo> - return info on group (specified, or current client's group)
    <listgroups> - list all group identifiers
    <joingroup> - add specified client to specified group, creating it if necessary
    <unjoingroup> - remove specified client from specified group -continued

```
<invokexform> - invoke transformer with given identifier
<listavailablexforms> - list all transformers
<listconnectedxforms> - list connected transformers
<listconnectedapps> - list connected apps
<listbridges> - list bridges the current group
<bridgeinfo> - get info on the specified bridge
<bridge> - create a bridge from one group to another
<unbridge> - create a bridge from one group to another
```

Figure 3:
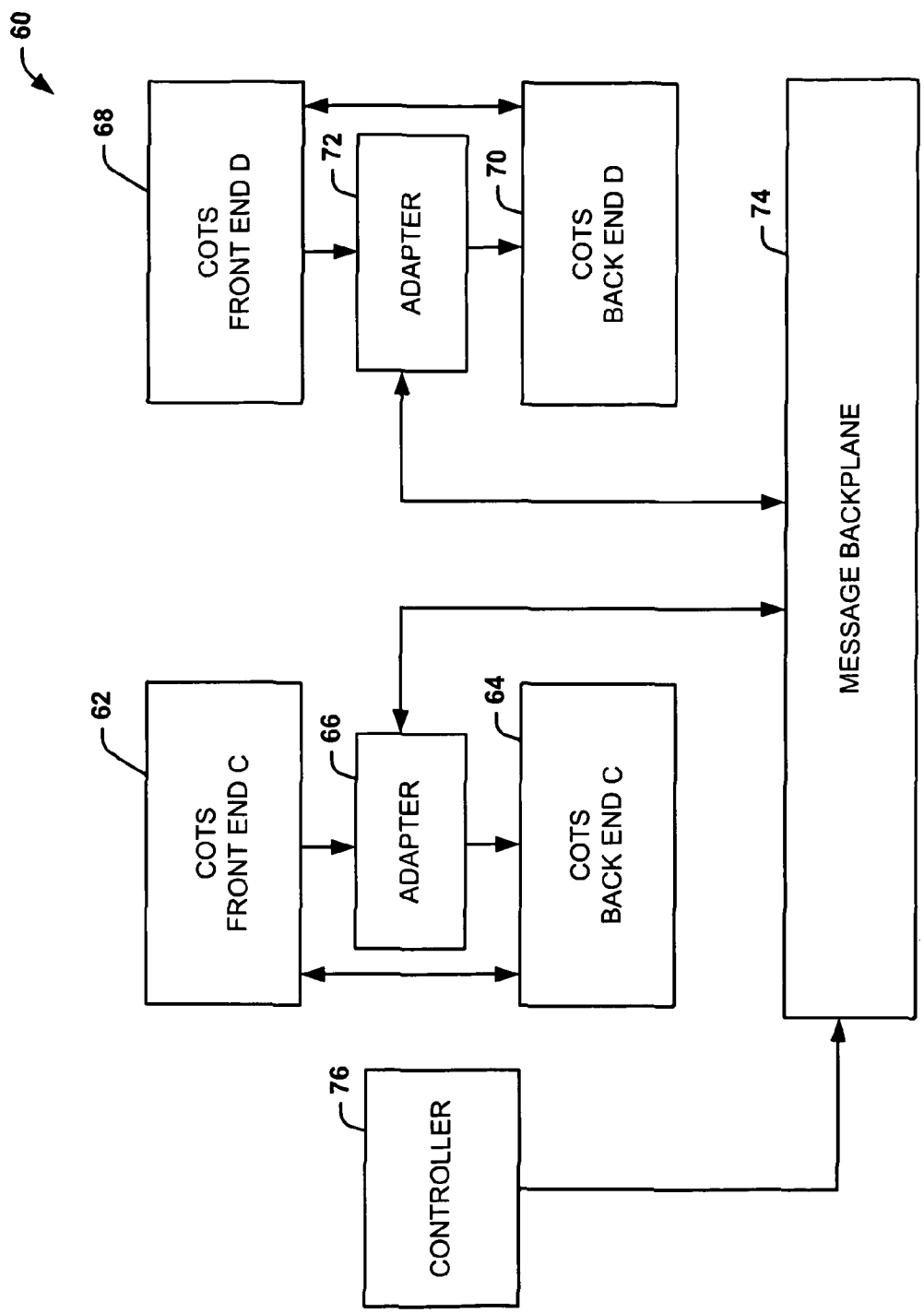
FIG. 3 illustrates a block diagram of a system for linking commercial off the shelf (COTS) software applications in accordance with an aspect of the present invention.

It is to be appreciated that the system of FIG. 2 works well with message bus aware applications. However, in many situations it is desirable to link two or more commercial off the shelf (COTS) applications. FIG. 3 illustrates a block diagram of system 60 for linking COTS software applications in accordance with an aspect of the present invention. The system 60 employs message backplane adapters that convert messages between COT application formats and the message backplane format. A message backplane adapter is a code module or program which allows an existing COTS application to communicate with the message backplane. Although existing COTS applications have no native awareness of the message backplane, most professional grade applications have some means of communicating and being controlled by an agent other than an interactive GUI. Such interfaces are often TCP/IP based, or in the case of the Microsoft environment, based on COM or .NET. A message backplane adapter is a software device which interacts with an existing application (in whatever manner that application prefers) and presents an interface to the message backplane. The message backplane architecture requires individual applications to broadcast the "internal dialog" which connects application front end (e.g., GUI interface) to their operational back-end and to similarly receive information from outside which can be converted to internal events. For COTS applications, this is handled by a respective message backplane adapter.

FIG. 3 illustrates that message backplane adapters are provided for interfacing two COTS application programs C and D with a message backplane 74. A first message backplane adapter 66 provides an interface to a front end 62 and a back end 64 of COTS application C and the message backplane 74, and a second message backplane adapter 72 provides an interface to a front end 68 and back end 70 of COTS application D with the message backplane 74. A controller application 76 can communicate with the message backplane 74 to convey user requested connections and connect COTS application programs C and D via the respective message backplane adapters 66 and 72. Once applications are linked, the messages between back end 64 and front end 62 of COTS application C are provided to the message backplane 74 which routes these messages to back end 70 of COTS application program D. Additionally, messages between back end 70 and front end 68 of COTS application D are provided to the message backplane 74 which routes these messages to the back end 64 of COTS application C.

It is to be appreciated that although the adapter is illustrated as being inserted in between the front and back ends of the COTS application, a COTS application may not be architected with this clear separation, and may not have direct access to the messaging layer. Usually the COTS application exposes some level of connectability for the adapter to provide and consume messages "as if" it were located as illustrated in FIG. 3. However in practice, it is usually simulating this behavior which means essentially it is narrating events it observes inside of the COTS application as the application makes them available through whatever interface the COTS application provides. Similarly, incoming information to the adapter is transformed into commands for the COTS application "as if" there were a direct message sharing into the (hypothetical) internal data bus of the COTS application.

The following is exemplary pseudocode for executing functions of an adapter:

```
(For Microsoft Outlook)
Register with host application to be loaded at application startup
Call SDK Run method to connect to backplane
When an email message is selected
    Extract sender/recipient/subject/body fields
    Construct XML/SOP representation
    Call SDK Send method to broadcast over the backplane
```

Though the message backplane framework is designed to make messages understandable to all message backplane aware applications and adapters, it is often the case that a user or developer would like to make two applications communicate which do not natively operate using the same sorts of objects. For example one application may deal with airplanes and geospatial data, while another deals with people and their associated information. The present invention employs message backplane transformers. A message backplane transformer is any element which can be installed into the message backplane and which has the function of transforming information of one type into information of another type. A transformer is a tool which can be inserted into a link connecting different message backplane aware applications, or groups of applications, which will convert one data type to another. Message backplane transformers can work in many different ways, but one common means for a transformer to operate is via a database query to some external data store. Transformers are general programs and can be written in any language, though primarily the expectation is that the languages for which a software development kit (SDK) supplies an API that can be used.

Figure 4:
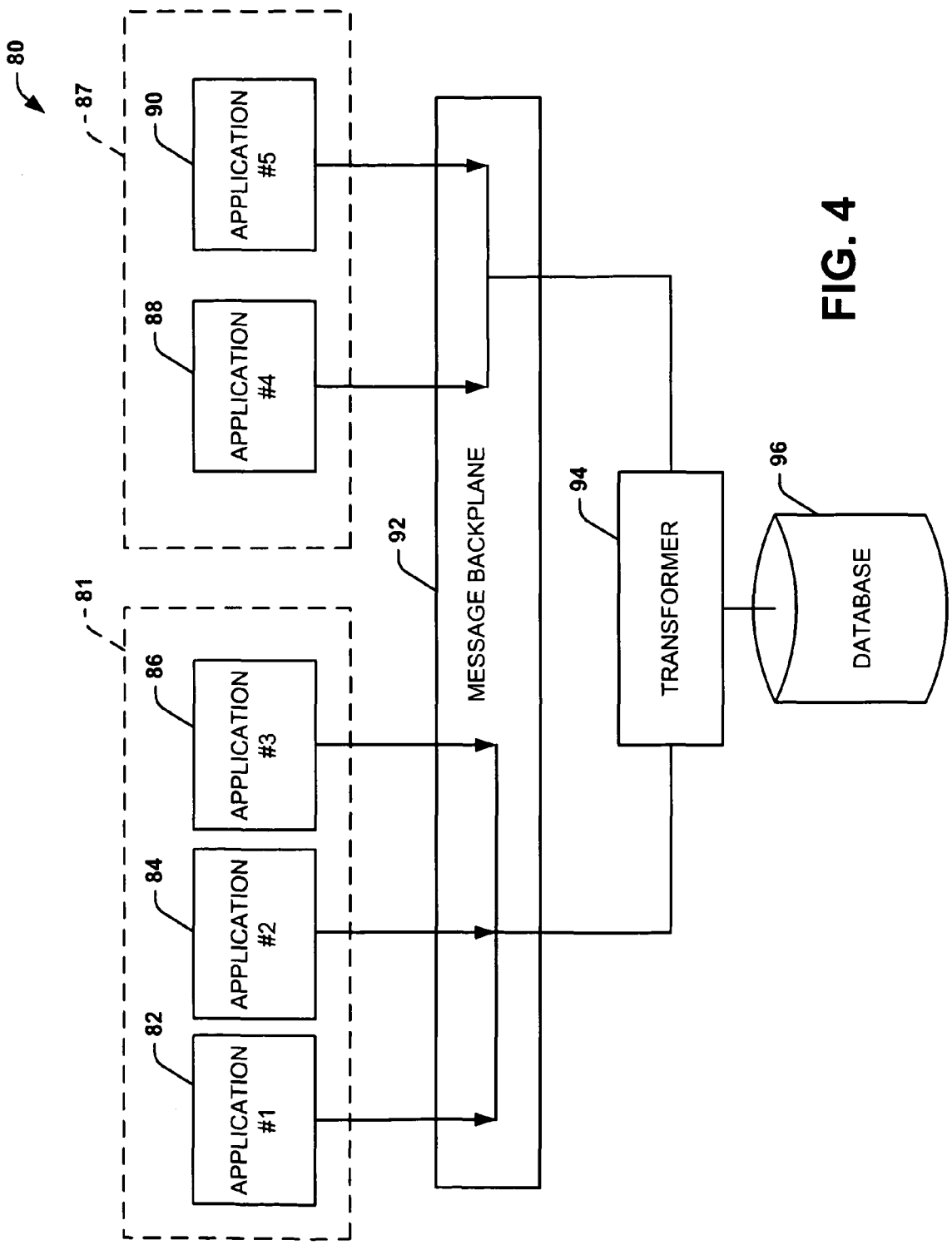
FIG. 4 illustrates a block diagram of a system for linking software applications employing transformers in accordance with an aspect of the present invention.

FIG. 4 illustrates a block diagram of a system 80 for linking software applications employing transformers in accordance with an aspect of the present invention. Application #1 82, application #2 84 and application #3 86 are linked together as a first linked group 81 and application #4 88 and application #5 90 are linked together as a second linked group 87. The data types from event messages of members of the first linked group 81 are shared with one another and the information from data types from event messages of members of the second linked group 87 are shared with one another. However, the messages from members of the first linked group 81 do not understand the data types from messages of members of the second linked group 87. For example, the first linked group 81 can understand an airline flight data type but cannot understand a person data type, while the second linked group 87 cannot understand an airline flight data type but can understand a person data type. The first and second linked groups 81 and 87 are linked together through a message backplane transformer 94. The message backplane transformer 94 is coupled to and has access to a database 96, such as a passenger flight list database.

The message backplane transformer 94 receives messages from the first linked group 91 via the message backplane 92 that contain data types that are not understandable to members of the second linked group 87. The message backplane transformer 94 retrieves information from the database 96 that links or associates data types understandable to members of the first linked group 81 with data types understandable to members of the second linked group 87. Additionally, the message backplane transformer 94 receives messages from the second linked group 87 via the message backplane 92 that contain data types that are not understandable to members of the first linked group 81. The message backplane transformer 94 retrieves information from the database 96 that links or associates data types understandable from the second linked group 87 with data types understandable to members of the first linked group 81.

For example, an event can occur in an application member of the first linked group 81 such as selecting a flight schedule. A message associated with this event can be passed to the message backplane transformer 94 which receives the flight schedule and retrieves a passenger list for the flight schedule from the database 96, which is then provided to members of the second linked group 87. The members of the second linked group 87 can extract the person data type off of the passenger list database and perform the functions associated with the respective members association with the person data type. Also, an event can occur in an application member of the second linked group 87 such as selecting a person. This event can generate a message that is passed to the transformer 94 which receives the person's name and retrieves a passenger list associated with a flight that that person is on from the database 96, which is then provided to members of the first linked group 81. The members of the first linked group 81 can extract a flight schedule that the person is on off of the passenger list database and perform the function associated with the respective members association with a given flight schedule.

Figure 5:
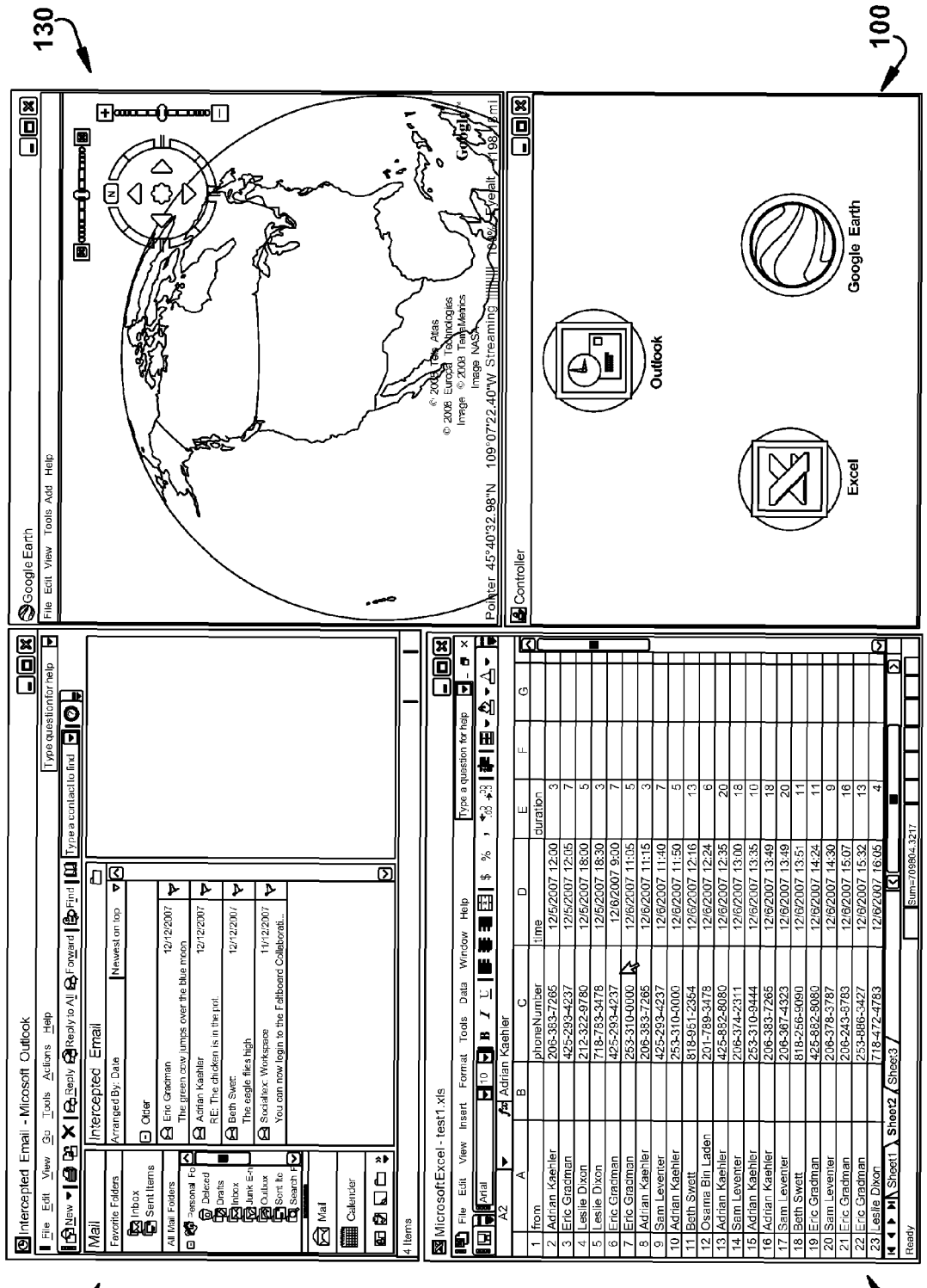
FIG. 5 illustrates a GUI controller and a plurality of GUIs associated with respective COTS applications in accordance with an aspect of the present invention.

FIGS. 5-8 illustrate linking of applications employing a GUI controller 100 and the sharing of information in the messages of the applications between the link application in accordance with an aspect of the invention. FIG. 5 illustrates a GUI controller 100 and a plurality of GUIs associated with respective COTS applications. In particular, a first GUI 110 associated with Microsoft® Outlook®, a second GUI 120 associated with Microsoft® Excel® and a third GUI 130 associated with Google® Earth. The GUI controller 100 includes a work space in which adapters of COTS applications have registered with the message backplane causing Icon representations COTS application programs that include Microsoft® Outlook®, Microsoft® Excel® and Google® Earth. The GUI controller 100 is configured to transmit instructions to the message backplane to link and unlink certain applications. The applications can be linked to one another by dragging dropping one representative icon over another representative icon. This causes the applications to link to one another such that their representative adapters transmit and receive each others messages via the message backplane.

Figure 6:
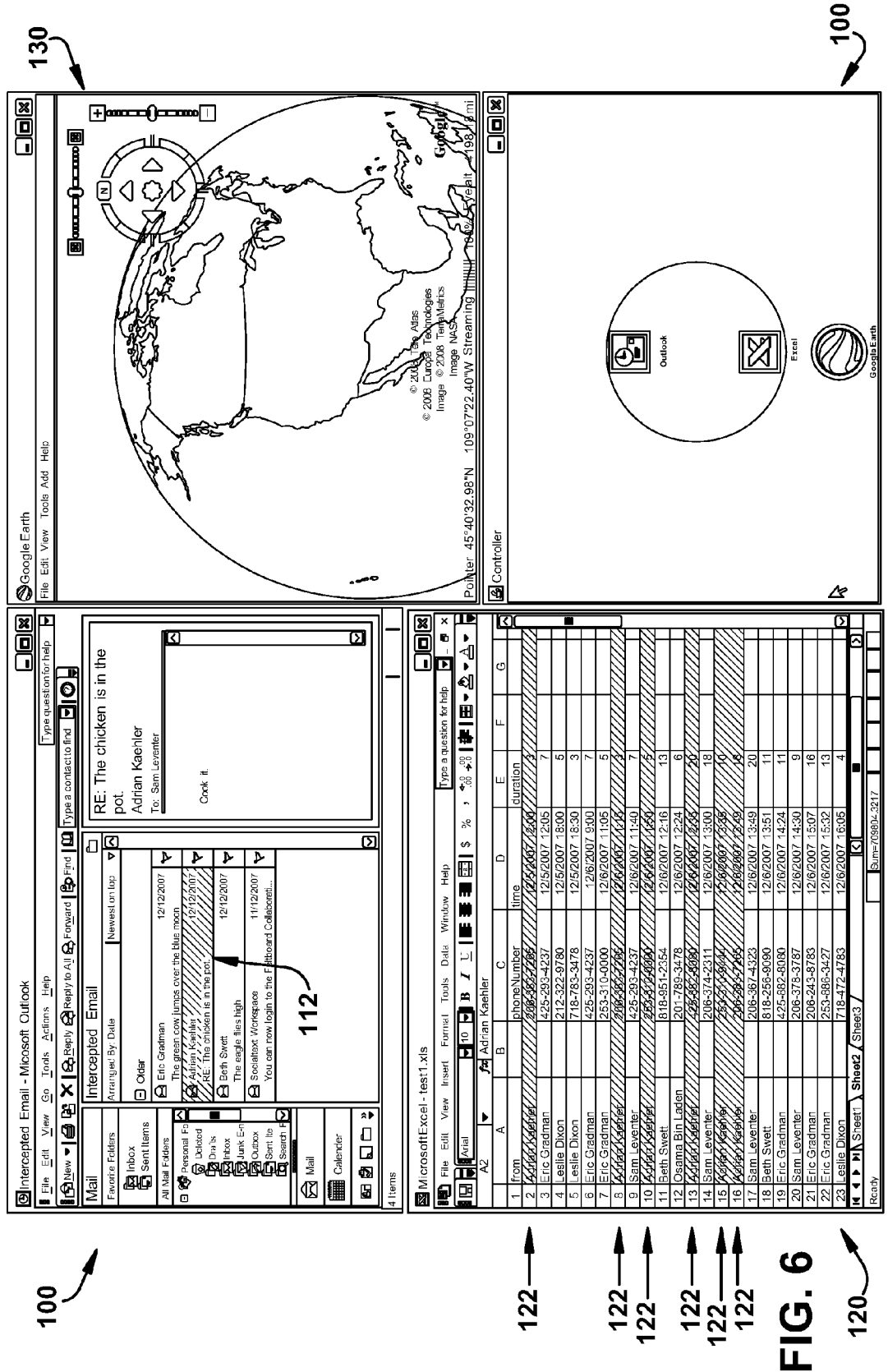
FIG. 6 illustrates a circular linking portion residing in the GUI controller work space in accordance with an aspect of the invention.

FIG. 6 illustrates a circular linking portion residing in the GUI controller work space in accordance with an aspect of the invention. Icons for Microsoft® Outlook® and Microsoft® Excel® reside within the circular linking portion providing a representation that these two programs have been linked as a linked group and share each other's messages, such that events in one application can trigger events in the other application. As further illustrated in FIG. 6, a user has selected a specific e-mail 112 in the first GUI 110 associated with Microsoft® Outlook®, which causes a message with the name "Adrian Kaehler" to be transmitted over the message backplane and received by the application Microsoft® Excel®. The application Microsoft® Excel® includes a file test .xIs that is open and includes a name and associated phone number list with different names and associated phone numbers. The application Microsoft® Excel® provides instructions to the second GUI 120 associated with Microsoft® Excel® to highlight any row 122 with the name "Adrian Kaehler" and its associated phone number as can be seen in FIG. 6.

Figure 7:
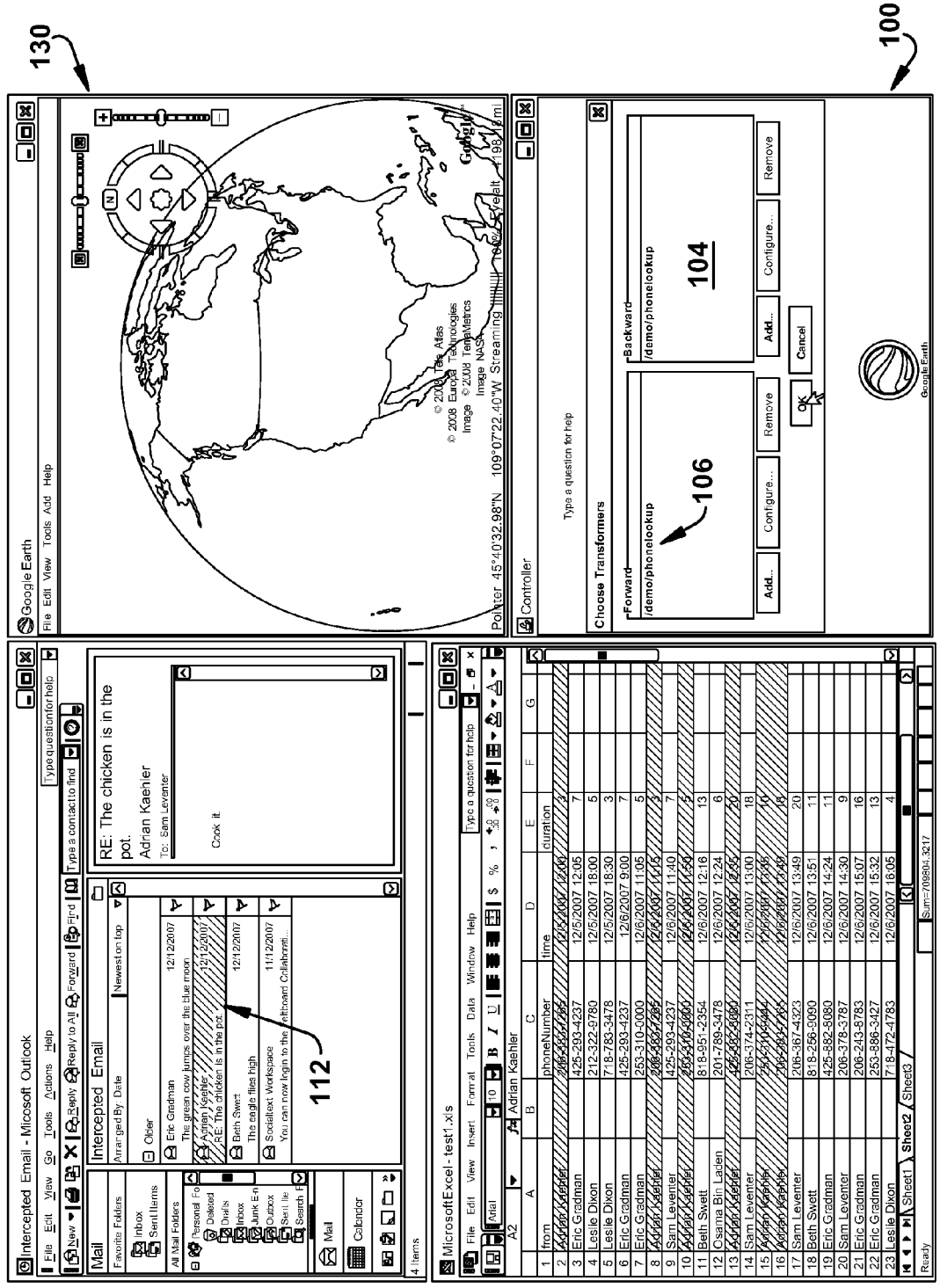
FIG. 7 illustrates a selection of a transformer in the GUI controller workspace in accordance with an aspect of the invention.

FIG. 7 illustrates a selection of a transformer in the GUI controller workspace in accordance with an aspect of the invention. Another application can be selected to be linked to the linked group by a transformer. The transformer provides a relationship between data types that application programs previously did not understand. In FIG. 7, a user has selected to link the linked group of Microsoft® Outlook® and Microsoft® Excel® to Google® Earth employing a transformer selection window 104 and has selected the transformer "phone lookup" 106.

Figure 8:
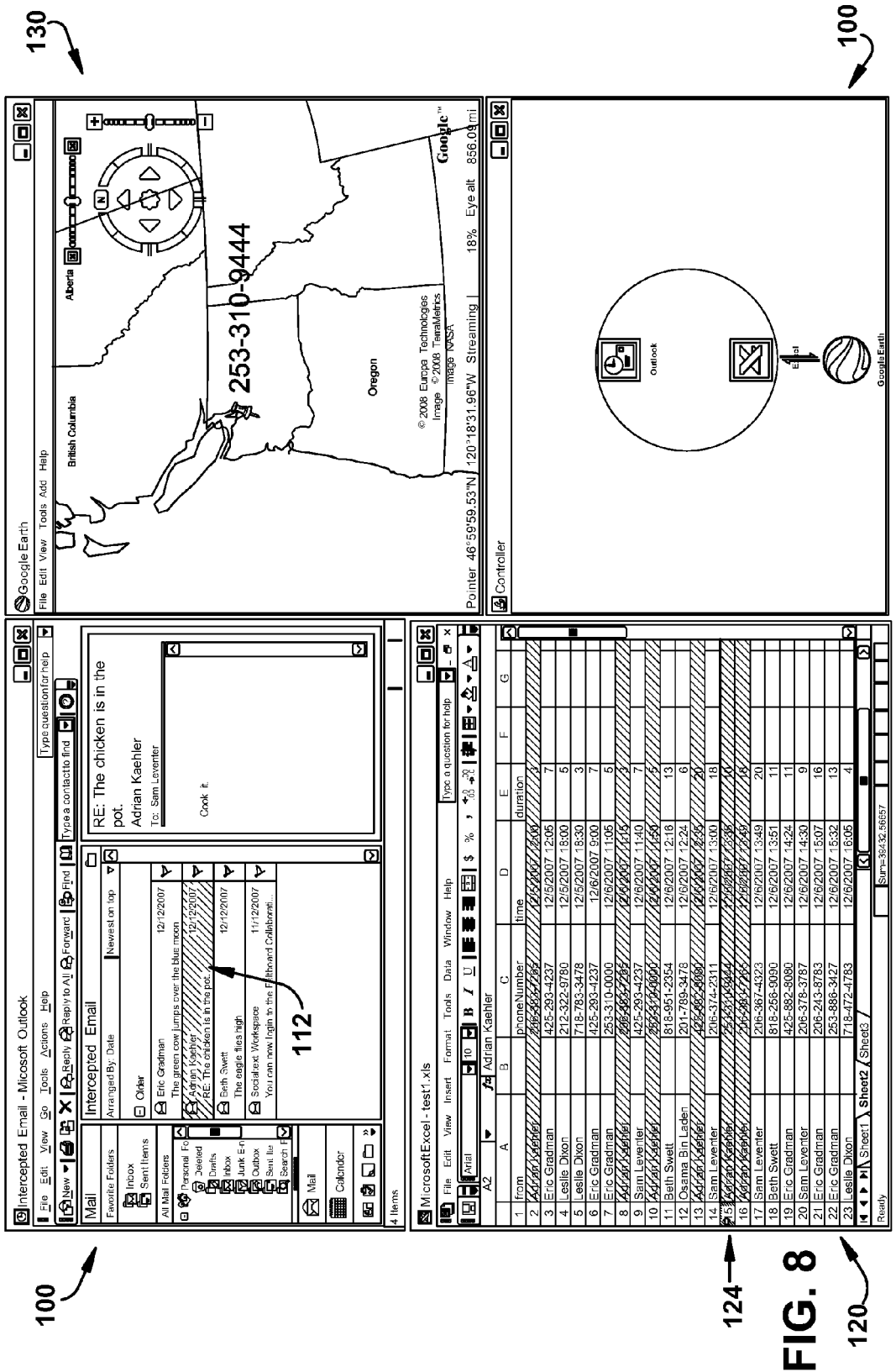
FIG. 8 illustrates the linking of the group Microsoft® Outlook® and Microsoft® Excel® to Google® Earth by the transformer via two double arrows outside the linking space in accordance with an aspect of the invention.

FIG. 8 illustrates the linking of the group Microsoft® Outlook® and Microsoft® Excel® to Google® Earth by the transformer via two double arrows outside the linking space. The "phone lookup" transformer 106 provides addresses associated with the phone number or person provided by the linked group to Google® Earth. As illustrated, in FIG. 8, a user has selected one of the phone numbers 124 associated with "Adrian Kaehler", which causes a message containing a respective phone number to be passed across the message backplane to the transformer "phone lookup" 106 which generates addresses associated with associated phone numbers. Google® Earth receives the address associated with the phone number and rotates the representation of Earth to the respective address location associated with the selected phone number.

FIG. 9 illustrates the linking of graphical user interfaces of application programs in accordance with an aspect of the present invention. A GUI 160 of a first linked application is connected to a GUI 170 of a second linked application via a graphically idiom 180. The GUIs 170 and 180 of the first and second linked applications become locked such that movement of one GUI causes the other to move concurrently therewith. Once linked, the two GUIs 170 and 180 move together as one. FIG. 10 illustrates the graphically idiom 180 that illustrates the linking of two application windows. FIG. 11 illustrates a graphically idiom 190 that illustrates the unlinking of two application windows.

The following illustrates psuedocode for perfoming the function of attaching windows during the linking of software application:

---

For each linked application, hook the main window handler.
Optionally, draw a custom frame around the window
When the window is moved and it is not currently grouped,
check if it is within a specified distance from another linked application window:
Adjust the position of the window so it "snaps" touching the windows together
Draw an arrow icon overlaying the window frames indicating they are now linked.
Notify the backplane that these applications are now grouped together
If it is currently grouped, when the window is moved furtherthan the specified distance,
Remove the arrow icon overlay, Notify the backplane that the application that is being
moved is no longer part of the group.

-continued

If a message is received from the backplane notifying that the application is no longer part of the group:
Move the window away from the other windows in the group
Remove the arrow overlay
If a message is received from the backplane notifying that the application is part of a group:
Determine a new window position adjacent to a window currently in the group, based on the applications currently in the group, and total size of the screen.
Move the application to that location if possible.
Draw an arrow overlay indication the applications are linked.

Figure 12:
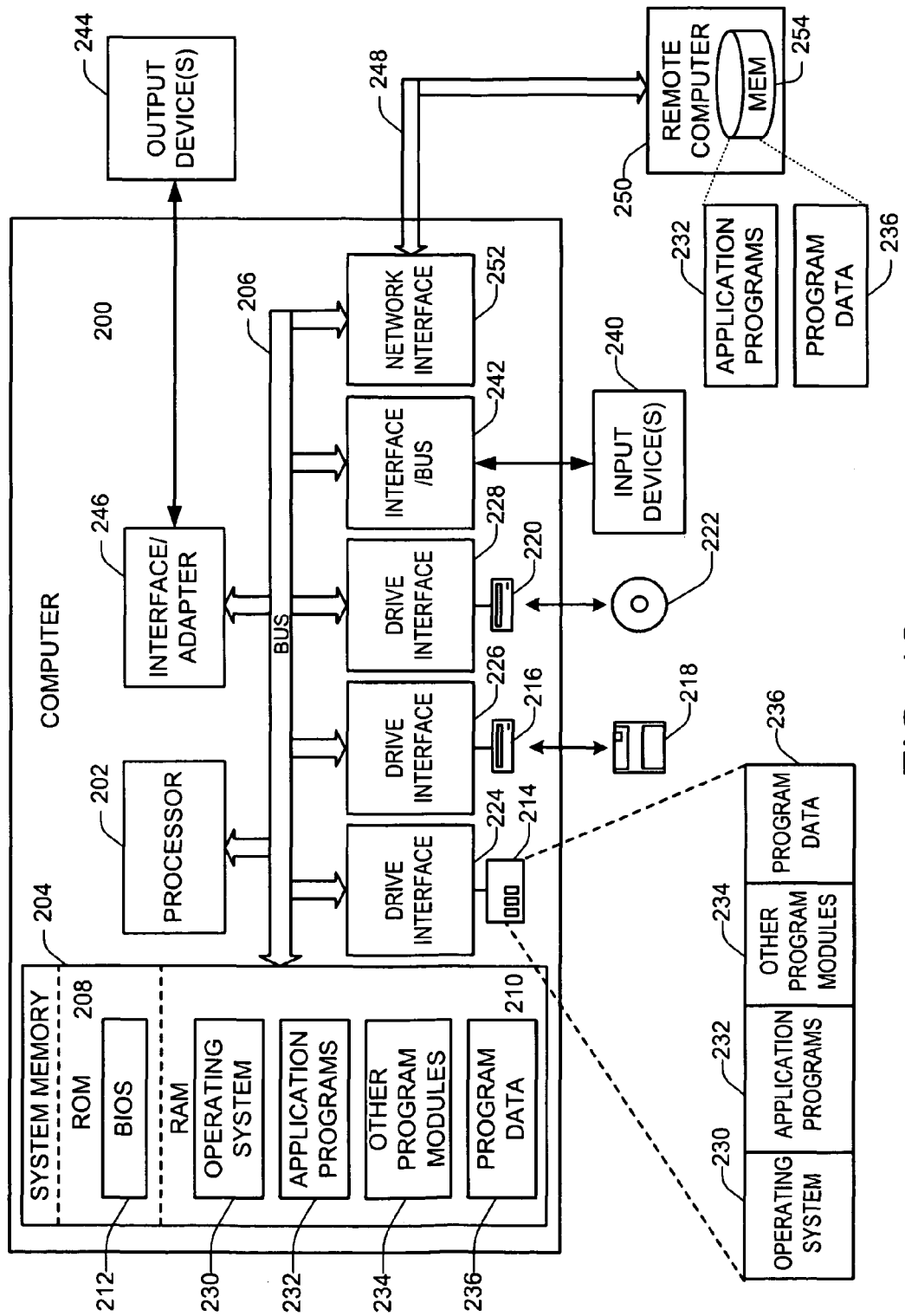
FIG. 12 illustrates a computer system that can be employed to implement systems and methods described herein, such as based on computer executable instructions running on the computer system.

FIG. 12 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236, such as a message backplane and a controller for instructing the message backplane to link events by sharing messages associated with events between software applications.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A system for linking software applications, the system comprising:
 a memory to store machine readable instructions; and
 a processing unit to access the memory and execute the machine readable instructions, the machine readable instructions comprising:
  a message backplane configured to link software applications by sharing messages associated with events occurring in a respective linked software application with one or more other linked software applications; and
  a controller configured to instruct the message backplane to link software applications, the controller comprising a GUI controller work space that contains icons that represent application programs that are currently running, wherein a user can drag one icon associated with a first application program over another icon associated with a second application program that causes the controller to instruct the message backplane to link events in the first and second application programs, wherein a user can select a given transformer from a given plurality of transformers to link data types of a first data type understandable by the first application program to data types of a second data type understandable by the second application program, wherein each of the given plurality of transformers specifies a first category of information to extract from the first data type and a second category of information to provide to the second data type;

wherein the first data type is an email comprising:
 a name of a person; and
 an e-mail address associated with the person;

wherein the second data type is a spreadsheet data set comprising:
 a name of the person; and
 a telephone number associated with the person;
 wherein the first and second categories of information are the name of the person;
 wherein the user can further drag a second icon associated with the second application program over another icon associated with a third application program that causes the controller to instruct the message backplane to link events in the second and third application programs, wherein the user can select another transformer from another plurality of transformers to link data types of the second data type understandable by the second application program to data types of a third data type understandable by the third application program, wherein each of the another plurality of transformers specifies a third category of information to extract from the second data type and a fourth category of information to provide to the third data type, wherein the third data type comprises a phone number lookup record, and the third and fourth categories of information are the telephone number associated with the person.

2. The system of claim 1, wherein a software application is configured to register with the message backplane to share messages associated with events in the software application with other registered software applications.

3. The system of claim 1, wherein the message backplane routes messages that have been transmitted from a front end to a back end of the first registered software application to a back end of the second software application, such that the back end of the second application extracts and responds to information of a type that the second software application understands and generates instructions to the front end of the second software application to cause events to occur in the front end of the second software application based on the received information.

4. The system of claim 1, wherein the message backplane monitors TCP/IP connections of software applications and transmits messages that have been transmitted from a front end to a back end of a first software application to a back end of a second software application via a TCP/IP connection.

5. The system of claim 1, wherein messages associated with events are transmitted employing an extensible markup language (XML) based message protocol.

6. The system of claim 1, wherein the machine readable instructions further comprise a message adapter configured to convert commercial off the shelf (COTS) application messages from a COTS application message format to a message backplane message format and message backplane message format to a COTS application message format.

7. The system of claim 1, further comprising a database accessible by the given transformer that contains a fourth data type that links data of the first data type to data of the second data type.

8. The system of claim 1, wherein the GUI controller work space includes a linking portion in which icons that represent linked application programs reside.

9. The system of claim 1, wherein a first graphical user interface (GUI) of the first application program is linked to a second GUI of the second application program when the message backplane links the first and second application programs, such that movement of one of the first and second GUIs causes concurrent movement of the other of the first and second GUIs.

10. The system of claim 9, wherein the first and second GUIs reside in a side by side relationship linked together by a graphical idiom that represents the linking of the first and second application programs.

11. A non-transitory computer readable medium having computer executable components for linking software applications, the non-transitory computer readable medium comprising:
 a message backplane component configured to register software application programs for sharing messages and to capture and forward messages that are transmitted between a front end and a back end of a registered software application with other registered software applications; and
 a controller configured to instruct the message backplane to at least one of register and unregister a given software application, the controller comprising a GUI controller work space that contains icons that represent registered software application programs that are currently running, wherein a user can drag one icon associated with a first registered software application program over another icon associated with a second registered software application program that causes the controller to instruct the message backplane to link events in the first and second registered software application programs, wherein a user can select a given transformer from a given plurality of transformers to link data types of a first data type understandable by the first registered software application program to data types of a second data type understandable by the second registered software application program, wherein each of the given plurality of transformers specifies a first category of information to extract from the first data type and a second category of information to provide to the second data type;

wherein the first data type is an email comprising:
 a name of a person; and
 an e-mail address associated with the person;

wherein the second data type is a spreadsheet data set comprising:
 a name of the person; and
 a telephone number associated with the person;
 wherein the first and second categories of information are the name of the person;
 wherein the user can further drag a second icon associated with the second registered software application program over another icon associated with a third registered software application program that causes the controller to instruct the message backplane to link events in the second and third registered software application programs, wherein the user can select a another transformer from another plurality of transformers to link data types of the second data type understandable by the second registered software application program to data types of a third data type understandable by the third registered software application program, wherein each of the another plurality of transformers specifies a third category of information to extract from the second data type and a fourth category of information to provide to the third data type, wherein the third data type comprises a phone number lookup record, and the third and fourth categories of information are the telephone number associated with the person.

12. The non-transitory computer readable medium of claim 11, wherein the message backplane monitors TCP/IP connections of registered software applications, extracts data types from messages passed between a front end to a back end of the first registered software application, builds a message based on the extracted data types and transmits the built message to a back end of the second registered software application via a TCP/IP connection.

13. The non-transitory computer readable medium of claim 11, further comprising a message adapter configured to convert commercial off the shelf (COTS) application messages from a COTS application message format to a message backplane message format and a message backplane message format to a COTS application message format.

14. The non-transitory computer readable medium of claim 11, further comprising a database accessible by the given transformer that contains a fourth data type that links data of the first data type to data of the second data type.

15. The non-transitory computer readable medium of claim 11, wherein a first graphical user interface (GUI) of the first registered application program is linked to a second GUI of the second registered application program when the message backplane links the first and second registered application programs, such that movement of one of the first and second GUIs causes concurrent movement of the other of the first and second GUIs, wherein the first and second GUIs reside in a side by side relationship linked together by a graphical idiom that represents the linking of the first and second application programs.

16. A method for linking software applications, the method comprising:
 providing a GUI controller work space that contains icons that represent application that are currently running;
 receiving instructions for linking events between two or more software applications in response to a user dragging, in the GUI controller work space, one icon associated with a first software application program over another icon associated with a second software application program;
 selecting a given transformer from a given plurality of transformers to link data types of a first data type understandable by the first software application program to data types of a second data type understandable by the second software application program, wherein each of the given plurality of transformers specifies a first category of information to extract from the first data type and a second category of information to provide to the second data type;
 wherein the first data type is an email comprising:
  a name of a person; and
  an e-mail address associated with the person;
 wherein the second data type is a spreadsheet data set comprising:
  a name of the person; and
  a telephone number associated with the person;
 wherein the first and second categories of information are the name of the person;
 monitoring messages between a front end and a back end of each linked software application;
 extracting data types of a given message provided in response to an event of a linked software application;
 building a message based on the extracted data types based on the given transformer;
 transmitting the built message to a back end of the second software application program in response to an event in the first software application program;
 receiving instructions to link events in the second software application program and a third software application in response to dragging a second icon associated with the second software application program over another icon associated with the third software application program; and
 selecting another transformer from another plurality of transformers to link data types of the second data type understandable by the second software application program to data types of a third data type understandable by the third software application program, wherein each of the another plurality of transformers specifies a third category of information to extract from the second data type and a fourth category of information to provide to the third data type, wherein the third data type comprises a phone number lookup record, and the third and fourth categories of information are the telephone number associated with the person.

17. The method of claim 16, wherein the monitoring messages comprises monitoring TCP/IP connections associated with a linked software application.

18. The method of claim 16, wherein the built messages are built employing an extensible markup language (XML) based message protocol.

19. The method of claim 16, further comprising converting the given message from a commercial off the shelf (COTS) application message format to a message backplane message format and converting the built message from a message backplane message format to a COTS application message format.

20. The method of claim 16, further comprising linking data types of the first data type to data types of the second data type via a third data type.

21. The method of claim 16, further comprising linking a first graphical user interface (GUI) of the first application program to a second GUI of the second application program, such that movement of one of the first and second GUIs causes concurrent movement of the other of the first and second GUIs.

* * * * *